US005829011A

United States Patent [19]

Glover

[11] Patent Number: 5,829,011
[45] Date of Patent: Oct. 27, 1998

[54] APPARATUS AND METHOD OF EXCHANGING DATA AND OPERATIONAL PARAMETERS IN A MASS STORAGE SYSTEM

[75] Inventor: Kerry C. Glover, Wylie, Tex.

[73] Assignee: Texas Instruments Incorporated, Dallas, Tex.

[21] Appl. No.: 797,679

[22] Filed: Jan. 31, 1997

[51] Int. Cl.⁶ .................................................. G06F 12/00
[52] U.S. Cl. .............................. 711/100; 360/39; 360/51; 360/78.04; 360/78.09
[58] Field of Search ................................. 360/39, 51, 46, 360/78.04, 69, 75, 78.01, 78.09, 48, 77.08, 49; 711/100

[56] References Cited

U.S. PATENT DOCUMENTS

| | | | |
|---|---|---|---|
| 5,260,703 | 11/1993 | Nguyen et al. | 341/100 |
| 5,341,249 | 8/1994 | Abbott et al. | 360/46 |
| 5,444,583 | 8/1995 | Ehrlich et al. | 360/78.09 |
| 5,552,942 | 9/1996 | Ziperovich et al. | 360/51 |
| 5,606,466 | 2/1997 | Fisher et al. | 360/51 |
| 5,661,760 | 8/1997 | Patapoutian et al. | 375/341 |

OTHER PUBLICATIONS

Thapar, et al., "A Class Of Partial Response Systems For Increasing Storage Density In Magnetic Recording", *IEEE Transactions On Magnetics*, vol. Mag–23, No. 5, Sep. 1987, pp. 3666–3668.

Fredrickson, Lyle, J., "A (D.K.C)=(0,3,5/2) Rate 8/10 Modulation Code", *IEEE Transactions on Magnetics*, vol. 26, No. 5, Sep. 1990, pp. 2318–2320.

French, et al., "A Generalized Scheme For Generating And Detecting Recording Channel Output Waveforms With Controlled Pulse Polarity", *IEEE Transactions on Magnetics*, vol. 24, No. 6, Nov. 1988, pp. 2530–2532.

Fitzpatrick, et al., "A Maximum Likelihood Detector for Nonlinear Magnetic Recording", *IEEE Transactions on Magnetics*, vol. 27, No. 6, Nov. 1991, pp. 4816–4818.

Chopra, et al., "A Maximum Likelihood Peak Detecting Channel", *IEEE Transactions on Magnetics*, vol. 27, No. 6, Nov. 1991, pp. 4819–4821.

Patel, Arvind, M., "A New Digital Signal Processing Channel For Data Storage Products", *IEEE Transactions on Magnetics*, vol. 27, No. 6, Nov. 1991, pp. 4579–4584.

Menyennett, et al., "A New Runlength Limited Code For Binary Asymmetric Channels", *IEEE Transactions on Magnetics*, vol. 28, No. 5, Sep. 1992, pp. 2901–2903.

Sutardja, Pantas, "A Post–Compensation Scheme For Peak–Detect Channel", *IEEE Transactions on Magnetics*, vol. 26, No. 5, pp. 2303–2305.

Barndt, et al., "A Simple Statistical Model Of Partial Erasure In Thin Film Disk Recording Systems", *IEEE Transactions on Magnetics*, vol. 27, No. 6, Nov. 1991, pp. 4978–4980.

(List continued on next page.)

*Primary Examiner*—Tod R. Swann
*Assistant Examiner*—Mehdi Namazi
*Attorney, Agent, or Firm*—Bret J. Petersen; W. Daniel Swayze, Jr.; Richard L. Donaldson

[57] ABSTRACT

An electronic circuit used in the control and operation of a mass storage system (30) is provided that includes an SSD channel (10), and a control circuitry (11) having a microprocessor (28) and a read only memory (ROM) (29). During an initialization routine, microprocessor (28) and the ROM (29) of the control circuitry (11) provide operational parameters to the SSD channel (10) through a data/parameter path (13). The SSD channel (10) receives these operational parameters and stores them in a parameter memory (22) so that a read channel (18) may access the operational parameters during read operations. During read operations, the read channel (18) receives a stored data signal from a disk/head assembly (12) and a preamplifier (14). The read channel (18) processes the stored data signal and provides an output digital data signal. The digital data signal is provided to the control circuitry (11) through the data/parameter path (13). Thus, at different times, the operational parameters and the digital data signal are both exchanged through the data/parameter path (13).

20 Claims, 1 Drawing Sheet

OTHER PUBLICATIONS

Bergmans, Jan W.M., "A Simulation Study Of Adaptive Reception Schemes For High–Density Digital Magnetic Storage", *IEEE Transactions on Magnetics,* vol. 27, No. 1, Jan. 1991, pp. 717–723.

Wolf, Jack Keil, "A Survey Of Codes For Partial Response Channels", *IEEE Transactions on Magnetics,* vol. 27, No. 6, Nov. 1991, pp. 4585–4589.

Tang, et al., "A Technique For Measuring Nonlinear Bit Shift", *IEEE Transactions on Magnetics,* vol. 27, No. 6, Nov. 1991, pp. 5316–5318.

Kumar, et al., "ACT–Enabled 100 MHz Channel Equalizer", *IEEE Transactions on Magnetics,* vol. 27, No. 6, Nov. 1991, pp. 4799–4803.

Ungerboeck, Gottfried, Adaptive Maximum–Likelihood Receiver for Carrier–Modulated Data–Transmission Systems, *IEEE Transactions on Communications,* vol. Com–22, No. 5, May 1974, pp. 624–636.

Lin, et al., "An Estimation Technique For Accurately Modeling The Magnetic Recording Channel Including Nonlinerarities", *IEEE Transactions on Magnetics,* vol. 25, No. 5, Sep. 1989, pp. 4084–4086.

Hong, et al., "An Experimental 180 Mb/sec PRML Channel for Magnetic Recording", *IEEE Transactions on Magnetics,* vol. 27, No. 6, Nov. 1991, pp. 4532–4537.

Nunnelley, et al., "Analysis of Asymmetric Deterministic Bitshift Errors In A Hard Disk File", *IEEE Transactions on Magnetics,* vol. 26, No. 5, Sep. 1990, pp. 2306–2308.

Kobayashi, et al., "Application of partial–response Channel Codingto Magnetic Recording Systems", *IBM J. Res. Develop.,* Jul. 1970, pp. 368–375.

Bergmans, et al., "Characterization of Digital Recording Channels By Means Of Echo Cancellation Techniques", *IEEE Transactions on Magnetics,* vol. 25, No. 5, pp. 4078–4080.

Fredrickson, Lyle J., "Coding For Maximum Likelihood Detection On A Magnetic Recording Channel", *IEEE Transactions On Magnetics,* vol. 26, No. 5, pp. 2315–2317.

Lin, et al., "Combined ECC/RLL Codes", *IEEE Transactions on Magnetics,* vol. 24, No. 6, Nov. 1988, pp. 2527–2529.

Ryan, William E., "Comparative Performance Between Drop–Out Detection and Viterbi Reliability Metric Erasure Flaging", *IEEE Transactions on Magnetics,* vol. 28, No. 5, Sep. 1992, pp. 2898–2900.

Carley, et al., "Comparison of Computationally Efficient Forms of FDTS/DF Against PR4–ML", *IEEE Transactions on Magnetics,* vol. 27, No. 6, Nov. 1991, pp. 4567–4572.

Wood, et al., "Considerations For High Data Rate Recording With Thin–Film Heads", *IEEE Transactions on Magnetics,* vol. 26, No. 6, Nov. 1990, pp. 2954–2959.

Burkhardt, et al., "Contributions to the Application of the Viterbi Algorithm", *IEEE Transactions on Information Theory,* vol. IT–31, No. 5, Sep. 1985, pp. 626–634.

Moon, Jaekyun, "Discrete–Time Modeling of Transition–Noise–Dominant Channels and Study of Detection Performance", *IEEE Transactions on Magnetics,* vol. 27, No. 6, Nov. 1991, pp. 4573–4578.

French, Catherine A., "Distance Preserving Run–Length Limited Codes", *IEEE Transactions on Magnetics,* vol. 25, No. 5, Sep. 1989, pp. 4093–4095.

Wood, Roger, "Enhanced Decision Feedback Equalization", *IEEE Transactions on Magnetics,* vol. 26, No. 5, Sep. 1990, pp. 2178–2180.

Fredrickson, et al., "Error Detecting Multiple Block (d,k) Codes", *IEEE Transactions on Magnetics,* vol. 25, No. 5, Sep. 1989, pp. 4096–4098.

Howell, et al., "Error Rate Performance of Experimental Gigabit Per Square Inch Recording Components", *IEEE Transactions On Magnetics,* vol. 26, No. 5, 0980, pp. 2298–2302.

Lin, et al., "Experimental Studies of Nonlinearities in High Density Disk Recording", *IEEE Transactions on Magnetics,* vol. 28, No. 5, Sep. 1992, pp. 3279–3281.

Kenney, et al., "Evaluation of Magnetic Recording Detection Schemes for Thin Film Media", *IEEE Transactions on Magnetics,* vol. 27, No. 6, Nov. 1991, pp. 4822–4824.

Raghavan, et al., "Feed–Forward Timing Recovery For Digital Magnetic Recording", *IEEE Transactions on Magnetics,* vol. 27, No. 6, Nov. 1991, pp. 4810–4812.

Palmer, et al., "Identification of Nonlinear Write Effects Using Pseudorandom Sequences", *IEEE Transactions on Magnetics,* vol. Mag–23, No. 5, Sep. 1987, pp. 2377–2379.

Coker, et al., "Implementation of PRML in a Rigid Disk Drive", *IEEE Transactions on Magnetics,* vol. 27, No. 6, Nov. 1991, pp. 4538–4543.

Wood, Roger, "Jitter Vs. Additive Noise In Magnetic Recording Effects On Detection", *IEEE Transactions on Magnetics,* vol. Mag–23, No. 5, Sep. 1987, pp. 2683–2685.

Shafiee, et al., "Low–Complexity Viterbi Detection for a Family of Partial Response Systems[†]", *IEEE Transactions on Magnetics,* vol. 28, No. 5, Sep. 1992, pp. 2892–2994.

Coker, et al., "Magnetic Characterization Using Elements of a PRML Channel", *IEEE Transactions on Magnetics,* vol. 27, No. 6, Nov. 1991, pp. 4544–4548.

Klaassen, K.B., "Magnetic Recording Channel Front–Ends", *IEEE Transactions on Magnetics,* vol. 27, No. 6, Nov. 1991, pp. 4503–4508.

Koren, Norman L., "Matched Filter Limits and Code Performance in Digital Magnetic Recording", *IEEE Transactions on Information Theory,* vol. IT–18, No. 3, May 1972, pp. 363–378.

Baugh, et al., "Measurement of Noise in Magnetic Media", *IEEE Transactions on Magnetics,* vol. MAG–21, No. 5, Sep. 1983, pp. 1722–1724.

Palmer, et al., "Media Design Considerations for a PRML Channel", *IEEE Transactions on Magnetics,* vol. 29, No. 1, Jan. 1993, pp. 189–194.

Simmons, et al., "Media Design For User Density Of Up To 3 Bits Per Pulse Width", *IEEE Transactions on Magnetics,* vol. 29, No. 1, Jan. 1993, pp. 169–176.

Barndt, et al., "Media Selection For High Density Recording Channels", *IEEE Transactions on Magnetics,* vol. 29, No. 1, Jan. 1993, pp. 183–188.

Barndt, et al., "Modeling and Signal Processing for the Nonlinear Thin Film Recording Channel", *IEEE Transactions on Magnetics* vol. 28, No. 5, Sep. 1992, pp. 2710–2712.

Zeng, et al., "Modified Viterbi Algorithm for a Jitter–dominant $1-D^2$ Channel", *IEEE Transactions on Magnetics,* vol. 28, No. 5, Sep. 1992, pp. 2895–2897.

Wood, Roger, "New Detector For 1.k Codes Equalized to Class II Partial Response", *IEEE Transactions on Magnetics,* vol. 25, No. 5, Sep. 1989, pp. 4075–4077.

Tang, Yaw–Shing, "Noise Autocorrelation in High Density Recording on Metal Film Disks", *IEEE Transactions on Magnetics,* vol. MAG–22, No. 5, Sep. 1986, pp. 883–885.

Tang, Yaw–Shing, "Noise Autocorrelation in Magnetic Recording Systems", *IEEE Transactions on Magnetics*, vol. MAG–21, No. 5, Sep. 1985, pp. 1389–1394.

Melas, et al., "Noise in a Thin Metallic Medium: The Connections with Nonlinear Behaviour", *IEEE Transactions on Magnetics*, vol. 24, No. 6, Nov. 1988, pp. 2712–2714.

Moon, et al., "Nonlinear Effects of Transition Broadening", *IEEE Transactions on Magnetics*, vol. 27, No. 6, Nov. 1991, pp. 4831–4833.

Melas, et al., "Nonlinear Superposition in Saturation Recording of Disk Media", *IEEE Transactions on Magnetics*, vol. MAG–23, No. 5, Sep. 1987, pp. 2079–2081.

Moon, et al., "Nonlinearities in Thin–Film Media and Their Impact on Data Recovery", *IEEE Transactions on Magnetics*, vol. 29, No. 1, Jan. 1993, pp. 177–182.

Raghavan, et al., "On Feed–Forward and Feedback Timing Recovery for Digital Magnetic Recording Systems", *IEEE Transactions On Magnetics*, vol. 27, No. 6, 1/191, pp. 4810–4812.

Thapar, et al., "On the Performance of a Rate 8/10 Matched spectral Null Code for Class–4 Partial Response", *IEEE Transactions On Magnetics*, vol. 28, No. 5, Sep. 1992, pp. 2883–2888.

Kabal, et al., "Partial–Response Signaling", *IEEE Transactions on Communications*, vol. COM–23, No. 9, Sep. 1975, pp. 921–934.

Moon, et al., "Partial Response Signaling in a Magnetic Recording Channel", *IEEE Transactions on Magnetics*, vol. 24, No. 6, Nov. 1988, pp. 2973–2975.

Dolivo, et al., "Performance and Sensitivity Analysis of Maximum–Likelihood Sequence Detection on Magnetic Recording Channels", *IEEE Transactions on Magnetics*, vol. 25, No. 5, Sep. 1989, pp. 4072–4074.

Moon, et al., "Performance Comparison of Detection Methods in Magnetic Recording", *IEEE Transactions on Magnetics*, vol. 26, No. 6, Nov. 1990, pp. 3155–3172.

Ziperovich, Pablo, "Performance Degradation of PRML Channels Due to Nonlinear Distortions", *IEEE Transactions on Magnetics*, vol. 27, No. 6, Nov. 1991, pp. 4825–4827.

Armstrong, et al., "Performance Evaluation of a New Coding Scheme for the Peak Detecting Magnetic Recording Channel", *IEEE Transactions on Magnetics*, vol. 27, No. 6, Nov. 1991, pp. 4804–4806.

Abbott, et al., "Performance of Digital Magnetic Recording with Equalization and Offtrack Interference", *IEEE Transactions on Magnetics*, vol. 27, No. 1, Jan. 1991, pp. 705–716.

Weathers, et al., "Results on 'Controlled Polarity' Modulation and Coding", *IEEE Transactions on Magnetics*, vol. 25, No. 5, Sep. 1989, pp. 4090–4093.

Schneider, Richard C., "Sequence (Viterbi–Equivalent) Decoding", *IEEE Transactions on Magnetics*, vol. 24, No. 6, Nov. 1988, pp. 2539–2541.

Hilden, et al., "Shift Error Correcting Modulation Codes", *IEEE Transactions on Magnetics*, vol. 27, No. 6, Nov. 1991, pp. 4600–4605.

Moon, et al., "Signal–to–Noise Ratio Degradation with Channel Mismatch", *IEEE Transactions on Magnetics*, vol. 27, No. 6, Nov. 1991, pp. 4837–4839.

Thapar, et al., "Spectral Shaping for Peak Detection Equalization", *IEEE Transactions on Magnetics*, vol. 26, No. 5, Sep. 1990 pp. 2309–2311.

Abend, et al., "Statistical Detection for Communication Channels with Intersymbol Interference", *Proceedings of the IEEE*, vol. 58, No. 5, May 1970, pp. 779–785.

Beare, C.T., "The Choice of the Desired Impulse Response in Combined Linear–Viterbi Algorithm Equalizers", *IEEE Transactions On Communications*, vol. COM–26, No. 8, Aug. 1978, pp. 1301–1307.

Forney, David, Jr., "The Viterbi Algorithm", *Proceedings of the IEEE*, vol. 61, No. 3, Mar. 1973, pp. 268–278.

Tsang, et al., "Time–Domain Study of Proximity–Effect Induced Transition Shifts", *IEEE Transactions on Magnetics*, vol. 27, No. 2, Mar. 1991, pp. 795–802.

Wood, et al., "Viterbi Detection of Class IV Partial Response on a Magnetic Recording Channel", *IEEE Transactions on Communications*, vol. COM–34, No. 5, May 1986, pp. 454–461.

Fredrickson, Lyle, J., "Viterbi Detection of Matched Spectral Null Codes for PR 4 Systems", *IEEE Transactions on Magnetics*, vol. 28, No. 5, Sep. 1992, pp. 2889–2891.

Herman, R., Volterra Modeling of Digital Magnetic Saturation Recording Channels, *IEEE Transactions on Magnetics*, vol. 26, No. 5, Sep. 1990, pp. 2125–2127.

Schneider, Richard C., "Write Equalization for Generalized (d,k) Codes", *IEEE Transactions on Magnetics*, vol. 24, No. 6, Nov. 1988, pp. 2533–2535.

Forney, G. David, "Maximum–Likelihood Sequence Estimation of Digital Sequences in the Presence of Intersymbol Interference", *IEEE Transactions on Information Theory*, vol. IT–18, No. 3, May 1972, pp. 363–378.

APPARATUS AND METHOD OF EXCHANGING DATA AND OPERATIONAL PARAMETERS IN A MASS STORAGE SYSTEM

TECHNICAL FIELD OF THE INVENTION

This invention relates generally to the field of information storage and more particularly to an apparatus and method for exchanging data and operational parameters in a mass storage system.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space. An axiom in the computer industry is that there is no such thing as enough memory and disk storage space.

To meet these ever increasing demands, hard disk drives continue to evolve and advance. Some of the early disk drives had a maximum storage capacity of five megabytes and used fourteen inch platters, whereas today's hard disk drives are commonly over one gigabyte and use 3.5 inch platters. Correspondingly, advances in the amount of data stored per unit of area, or areal density, have dramatically accelerated. For example, in the 1980's, areal density increased about thirty percent per year while in the 1990's annual areal density increases have been around sixty percent. The cost per megabyte of a hard disk drive is inversely related to its areal density.

Mass storage device manufacturers strive to produce high speed hard disk drives with large data capacities at lower and lower costs. A high speed hard disk drive is one that can store and retrieve data at a fast rate. One aspect of increasing disk drive speed and capacity is to improve or increase the areal density. Areal density may be increased by improving the method of storing and retrieving data.

In general, mass storage devices, such as hard disk drives, include a magnetic storage media, such as rotating disks or platters, a spindle motor, read/write heads, an actuator, a pre-amplifier, a read channel, a write channel, a servo controller, and control circuitry to control the operation of the hard disk drive and to properly interface the hard disk drive to a host or system bus. The read channel, write channel, servo controller, and memory may all be implemented as one integrated circuit that is referred to as a data channel. The control circuitry often includes a microprocessor for executing control programs or instructions during the operation of the hard disk drive.

A hard disk drive (HDD) performs write and read operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The control circuitry moves the read/write heads to the appropriate track and locates the appropriate sector of the track. Finally, the HDD control circuitry transfers the data from the DRAM to the located sector of the disk platter through the write channel. The write channel may encode the data so that the data can be more reliably retrieved later. A sector generally has a fixed data storage capacity, such as 512 bytes of user data per sector.

In a read operation, the appropriate sector to be read is located and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM of the control circuitry. The processor then communicates to the host that data is ready to be transferred. When data is being either read or written in a HDD, data is exchanged between the control circuitry and the read channel. This data exchange occurs over a data path operating at a high speed.

As the disk platters are moving, the read/write heads must align or stay on a particular track. This is accomplished by reading information from the disk called a servo wedge. Generally, each sector has a corresponding servo wedge. The servo wedge indicates the position of the heads. The data channel receives this position information so the servo controller can continue to properly position the heads on the track.

Traditional HDD read channels used a technique known as peak detection for extracting or detecting digital information from the analog information stored on the magnetic media. In this technique, the waveform is level detected and if the waveform level is above a threshold during a sampling window, the data is considered a "one." More recently, advanced techniques utilizing discrete time signal processing (DTSP) to reconstruct the original data written to the disk are being used in read channel electronics to improve areal density. In these techniques, the data is synchronously sampled using a data recovery clock. The sample is then processed through a series of mathematical manipulations using signal processing theory.

There are several types of synchronously sampled data (SSD) channels. Partial response, maximum likelihood (PRML); extended PRML (EPRML); enhanced, extended PRML (EEPRML); fixed delay tree search (FDTS); and decision feedback equalization (DFE) are several examples of different types of SSD channels using DTSP techniques. The maximum likelihood detection performed in several of these systems is usually performed by a Viterbi decoder implementing the Viterbi algorithm, named after Andrew Viterbi who developed it in 1967.

The SSD channel generally requires mixed-mode circuitry for performing a read operation. The circuitry may perform such functions as analog signal amplification, automatic gain control (AGC), continuous time filtering, signal sampling, DTSP manipulation, timing recovery, signal detection, and formatting. In all SSD channels, the major goal during a read operation is to accurately retrieve the data with the lowest bit error rate (BER) in the highest noise environment.

SSD channel performance is dependent upon the various physical properties and characteristics of the individual disk drive media and read/write heads that vary from one system to another. Each disk drive medium and read/write head is unique with individual physical and magnetic characteristics. The various properties and characteristics cannot be sufficiently controlled during manufacture to ensure uniformity. SSD channel circuitry may vary from one channel to the other resulting in the introduction of undesirable "noise" into the channel circuitry. Over time, the various physical properties and characteristics of the mass storage system or HDD may change resulting in decreased performance.

SSD channel performance may be optimized by using various operational parameters in the read channel circuitry to account for the variations unique to each system. For example, the filter coefficients or operational parameters of a finite impulse response (FIR) filter of an SSD channel may be used to adapt or equalize the FIR filter to accommodate for the unique properties of a particular HDD system. The operational parameters can be calculated for each HDD system to obtain optimal HDD performance. This may be done at the time of manufacture, during burn-in, and at various times during the life of the HDD to account for variations that occur over time. The operational parameters are provided to the SSD channel through a serial port or dedicated port directly connected to the SSD channel.

The calculation of the operational parameters is performed by a processor. Once calculated, the operational parameters are supplied to the SSD channel or read channel through a serial port during start-up. Serial ports have a limited data bandwidth. Problems arise because the limited data bandwidth of the serial port increases the time needed to supply the operational parameters to the SSD channel thus increasing overall start-up time. The limited bandwidth also harms overall HDD performance by slowing down overall HDD operation. Additionally, extra I/O pins may be necessary in the SSD channel to implement a dedicated serial port, thus increasing the overall cost, complexity, and size of the SSD channel.

SUMMARY OF THE INVENTION

From the foregoing it may be appreciated that a need has arisen for an improved apparatus and method for providing operational parameters to the read channel of a mass storage system. In accordance with the present invention, an apparatus and method for exchanging data and operational parameters in a mass storage system is provided which substantially eliminates and reduces the disadvantages and problems of providing operational parameters to a read channel through a serial port or some alternate path. Operational parameters are provided to the read channel of a mass storage system using the existing high speed data path that is also used to exchange data between the read channel and control circuitry during read and write operations. The use of the existing data path allows the operational parameters to be provided in a more timely manner which decreases the overall HDD start-up time and eliminates the need for the serial port circuitry directly connected to the read channel.

According to the present invention, an electronic circuit for use in a mass storage system is provided. The electronic circuit includes a parameter memory, a read channel, a control circuitry, and a data/parameter path. The parameter memory receives and stores an operational parameter received from the control circuitry through the data/parameter path. During a read operation, the read channel receives and processes stored data signals and generates an output data signal in response. The circuitry of the read channel accesses the operational parameter from the parameter memory during the read operation. The control circuitry receives the output data signal through the data/parameter path during a read operation.

The present invention provides various technical advantages over previously developed apparatus and method for providing operational parameters to the read channel of a mass storage system. For example, a technical advantage of the present invention includes the elimination of additional or dedicated serial ports for providing operational parameters to a read channel. Another technical advantage includes improved start-up or initialization times by providing the operational parameters to the read channel through a faster data path. Still another technical advantage includes reduced fabrication costs due to the elimination of unneeded circuitry. Other technical advantages are readily apparent to one skilled in the art from the following figures, description, and claims.

BRIEF DESCRIPTION OF THE DRAWINGS

For a more complete understanding of the present invention, and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
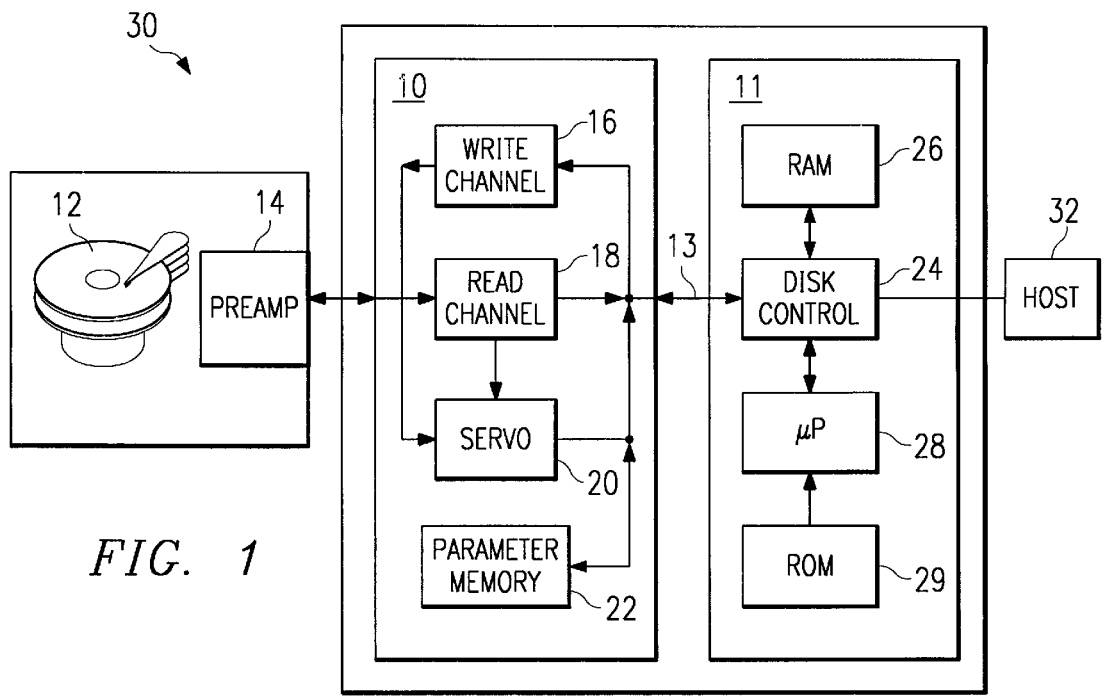
FIG. 1 is a block diagram illustrating a disk drive mass storage system.

FIG. 1 is a block diagram of a disk drive mass storage system 30 used for retrieving data during read operations and for storing data during write operations. Disk drive mass storage system 30 interfaces and exchanges data with a host 32 during read and write operations. Disk drive mass storage system 30 includes a disk/head assembly 12, a preamplifier 14, a synchronously sampled data (SSD) channel 10, and a control circuitry 11. Disk/head assembly 12 and preamplifier 14 are used to magnetically store data. SSD channel 10 and control circuitry 11 are used to process data that is being read from and written to disk/head assembly 12 and to control the various operations of disk drive mass storage system 30. SSD channel 10 and control circuitry 11 are coupled through data/parameter path 13. Data/parameter path 13 is a parallel path used to exchange data and operational parameters. Host 32 exchanges digital data with control circuitry 11.

Disk/head assembly 12 includes a number of rotating magnetic disks or platters used to store data that is represented as magnetic transitions on the magnetic platters. The read/write heads of disk/head assembly 12 are used to store and retrieve data from each side of the magnetic platters. The read/write heads may be any number of available read/write heads such as magneto-resistive heads. Preamplifier 14 interfaces between the read/write heads of disk/head assembly 12 and SSD channel 10 and provides amplification to the waveform data signals as needed.

SSD channel 10 is used during read and write operations to exchange analog data signals with disk/head assembly 12 through preamplifier 14 and to exchange digital data signals with control circuitry 11 through a data/parameter path 13. Operational parameters may also be provided to SSD channel 10 from control circuitry 11 through data/parameter path 13 during start-up. SSD channel 10 includes a write channel 16, a read channel 18, a servo control 20, and a parameter memory 22 used for storing the operational parameters supplied from control circuitry 11 through data/parameter path 13. SSD channel 10 may be implemented as a single integrated circuit.

During write operations, write channel 16 receives digital data from control circuitry 11 in parallel format through data/parameter path 13. The digital data is reformatted or coded for storage and provided to disk/head assembly 12. Write channel 16 may include a register, a scrambler, a phase locked loop, an encoder, a serializer, and a write precompensation circuit. The operation and timing of write channel 16 is controlled by a write clock signal.

During read operations, read channel 18 receives analog data signals from disk/head assembly 12 through preamplifier 14. Read channel 18 conditions, decodes, and formats the analog data signal and provides a digital data signal in parallel format to control circuitry 11 through data/parameter path 13. Read channel 18 includes any of a variety of circuit modules such as an automatic gain control circuit, a low pass filter, a variable frequency oscillator, a sampler, an equalizer, such as a finite impulse response filter, a maximum likelihood, partial response detector, a deserializer, and a synchronization field detection circuit. During a read operation, some of the circuit modules of read channel 18, such as the finite impulse response filter and low pass filter, may use various operational parameters or coefficients. The circuit modules of read channel 18 use the operational parameters to optimize or adapt their operation to account for the various physical and magnetic characteristics of disk drive mass storage system 30 that vary from system to system and influence operational performance. The operational parameters modify the operational characteristics of the circuit modules of read channel 18. For example, the finite impulse response filter of read channel 18 may employ a plurality of multipliers that each receive a filter coefficient used in filtering the read signal. In this example, the filter coefficients serve as the operational parameters. Similarly, the low pass filter used in read channel 18 may use operational parameters that establish the cutoff frequency and gain provided by the low pass filter. The operational parameters are stored in parameter memory 22 during start-up and may be accessed by the various circuit modules of read channel 18 for use during read operations.

Servo control 20 provides position error signals (PES) to control circuitry 11 during read and write operations. The PES relate to the position of the heads of disk/head assembly 12 so that the heads can be properly positioned during both read and write operations.

Control circuitry 11 is used to control the various operations of disk drive mass storage system 30 and to exchange digital data with SSD channel 10 and host 32. Control circuitry 11 includes a microprocessor 28, a disk control 24, a random access memory (RAM) 26, and a read only memory (ROM) 29. Microprocessor 28, disk control 24, RAM 26, and ROM 29 together provide control and logic functions to disk drive mass storage system 30 so that data may be received from host 32, stored, and later retrieved and provided back to host 32. ROM 29 includes preloaded microprocessor instructions for use by microprocessor 28 in operating and controlling disk drive mass storage system 30. ROM 29 may also store the operational parameters that are supplied to parameter memory 22 during start-up. RAM 26 is used for storing digital data received from host 32 before the digital data is supplied to SSD channel 10 for a write operation. RAM 26 also serves to store digital data received from SSD channel 10 before being supplied to host 32 after a read operation. RAM 26 may also provide data to microprocessor 28 and store data or results calculated by microprocessor 28. Disk control 24 includes various logic and bus arbitration circuitry used in properly interfacing disk drive mass storage system 30 to host 32 and for internally interfacing control circuitry 11 to SSD channel 10. Depending on the circuit implementation, any of a variety of circuitry may be used in disk control 24.

In operation, disk drive mass storage system 30 goes through an initialization or start-up routine when power is initially provided. One such routine instructs microprocessor 28 to supply operational parameters, previously stored in ROM 29, to parameter memory 22 of SSD channel 10 through data/parameter path 13. The operational parameters are then stored in memory registers of parameter memory 22 for use by read channel 18 during read operations. The operational parameters have been previously calculated, normally during burn-in, and stored in ROM 29. The operational parameters adapt or optimize the circuitry of read channel 18 to the specific physical and magnetic characteristics of disk drive mass storage system 30. Throughout the life of disk drive mass storage system 30, the various physical and magnetic characteristics may change. These changes may affect the operation of disk drive mass storage system 30. To account for these changes, various software routines or utilities may be executed at various times during the life of disk drive mass storage system 30 to modify or recalculate the various operational parameters that are stored in ROM 29 and provided to parameter memory 22 during start-up.

After the initialization routine is complete, data may be read from or written to disk/head assembly 12. Servo control 20 provides location information so that the read/write heads may be properly positioned on the disks to read and write data. In general, the operation of disk drive mass storage system 30 may be divided into read operations and non-read operations. Read operations involve the reading of data from the disks of disk head assembly 12 and non-read operations include write operations, servo operations, and times when the system is idle. Clock signals control both read operations and non-read operations.

During a read operation, host 32 initiates a request for data. After the read/write heads of disk/head assembly 12 are properly positioned, an analog data signal is provided to preamplifier 14. Read channel 18 receives the analog data signal from preamplifier 14, processes the analog data signal, and provides a corresponding digital data signal. This involves using various circuitry modules and techniques for synchronously sampling the analog data signal and detecting a digital signal. A read clock signal ensures that the data signal is synchronously sampled in the correct manner. Read channel 18 provides the digital data signal to disk control 24 through data/parameter path 13. Disk control 24 provides various digital logic control and arbitration circuitry between SSD channel 10, host 32, RAM 26, microprocessor 28, and ROM 29 during both read and write operations. The digital data is then stored in RAM 26 until microprocessor 28 communicates to host 32 that the data is ready to be transferred. Host 32 may be a system bus such as the system bus of a personal computer.

During a write operation, a digital data signal is received from host 32 and ultimately stored on disk/head assembly 12. Digital data is initially provided from host 32 to control circuitry 11. Control circuitry 11 stores the digital data in RAM 26. Microprocessor 28 schedules a series of events so that the data may then be transferred from RAM 26 to disk/head assembly 12, through write channel 16. This data exchange occurs through data/parameter path 13. RAM 26 first provides the data to write channel 16. Write channel 16 encodes the digital data and places the data in serial format. Write channel 16 then provides the data to disk/head assembly 12 after the heads of disk/head assembly 12 have been properly positioned to write or store the data at an appropriate location on the disk. The operation and timing of write channel 16 is controlled by a write clock signal.

Figure 2:
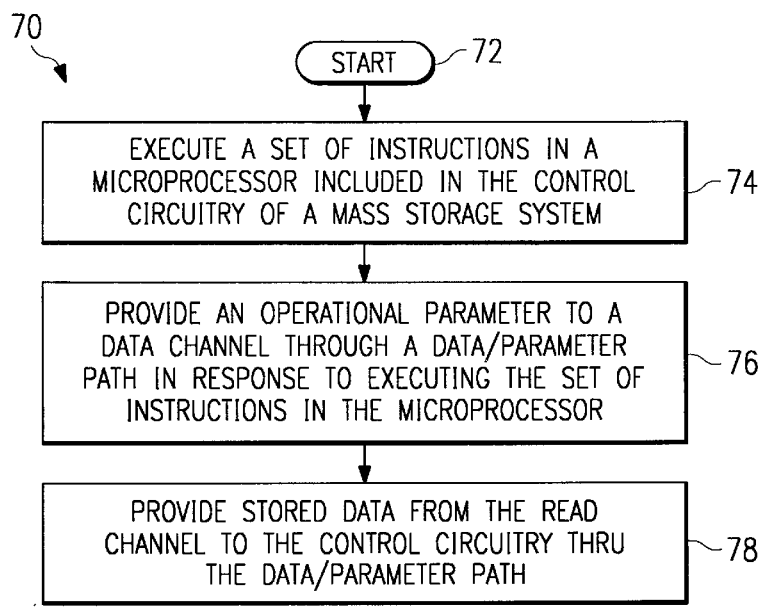
FIG. 2 is a flow chart illustrating a method for providing an operational parameter to a synchronously sampled data channel in a mass storage system.

FIG. 2 is a flow chart of a method 70 for providing an operational parameter to an SSD channel in a mass storage system. Method 70 includes various steps beginning at start block 72 and ending at step 78. Execution step 74 involves executing a routine or set of instructions in a microprocessor included in the control circuitry of a mass storage system. This may be done at start-up. In response to execution step 74, step 76 involves providing an operational parameter from the control circuitry of the mass storage system through a data and parameter path so that a read channel may access the operational parameter. Step 76 may involve retrieving an operational parameter from a memory device of the control circuitry, providing the operational parameter to an SSD channel through a data/parameter path, and storing the operational parameter in a parameter memory so that the read channel may access the operational parameter during a read operation. Next, step 78 includes providing data from the read channel to the control circuitry through the data/parameter path during a read operation. This method demonstrates the use of the data/parameter path for the transfer of both data and operational parameters.

The present invention, just described, eliminates the need for using an additional or external data port, such as a serial port, for providing operational parameters to the read channel of a mass storage system. By providing operational parameters to the read channel through the same path used to provide data to the read channel, the present invention also provides improved start-up and initialization times. Performance is enhanced by eliminating slower methods of providing operational parameters to the read channel such as by using slower serial ports.

Thus, it is apparent that there has been provided, in accordance with the present invention, a mass storage system and method that satisfies the advantages set forth above. Although the preferred embodiment has been described in detail, it should be understood that various changes, substitutions, and alterations can be made herein. For example, a variety of read channel or SSD channel operational parameters could be provided through a data/parameter path. These operational parameters could be provided at other times besides at start-up or initialization. Also, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention as defined by the following claims.

What is claimed is:

1. An electronic circuit for use in a mass storage system comprising:
    a parameter memory operable to receive and store an operational parameter;
    a read channel operable to receive and process a stored data signal during a read operation and to generate an output data signal in response, the read channel operable to access the operational parameter from the parameter memory during the read operation;
    control circuitry having a microprocessor and memory, the control circuitry operable to provide the operational parameter to the parameter memory, the control circuitry operable to receive the output data signal from the read channel during the read operation; and
    a data/parameter path coupling the control circuitry to the read channel and parameter memory, the data/parameter path operable to provide the operational parameter from the control circuitry to the parameter memory, the data/parameter path operable to provide the output data signal from the read channel to the control circuitry during the read operation.

2. The electronic circuit of claim 1 wherein the control circuitry provides the operational parameter to the parameter memory through the data/parameter path during an initialization routine.

3. The electronic circuit of claim 2 wherein the parameter memory is coupled to the read channel so that the read channel can access the operational parameter during read operations.

4. The electronic circuit of claim 2 wherein the parameter memory is random access memory.

5. The electronic circuit of claim 1 wherein the microprocessor of the control circuitry is a microcomputer having memory.

6. The electronic circuit of claim 1 wherein the microprocessor of the control circuitry is a digital signal processor.

7. The electronic circuit of claim 1 wherein the read channel is a synchronously sampled read channel.

8. The electronic circuit of claim 7 wherein the read channel is a partial response, maximum likelihood read channel.

9. The electronic circuit of claim 7 wherein the read channel is an extended partial response, maximum likelihood read channel.

10. The electronic circuit of claim 7 wherein the read channel is an enhanced, extended partial response, maximum likelihood read channel.

11. The electronic circuit of claim 7 wherein the read channel is a decision feedback equalization read channel.

12. A disk drive mass storage system comprising:
    a disk/head assembly having a data storage disk and a read/write head, the disk/head assembly operable to magnetically store and retrieve data;
    a write channel operable to provide a data signal to the disk/head assembly for storage during a write operation;
    a parameter memory operable to receive and store an operational parameter;
    a read channel operable to receive and process a stored data signal from the disk/head assembly during a read operation and to generate an output data signal in response, the read channel operable to access the operational parameter from the parameter memory during the read operation;
    control circuitry having a microprocessor and memory, the control circuitry operable to provide the operational parameter to the parameter memory, the control circuitry operable to receive the output data signal from the read channel during a read operation; and
    a data/parameter path coupling the control circuitry to the read channel and parameter memory, the data/parameter path operable to provide the operational parameter from the control circuitry to the parameter memory, the data/parameter path operable to provide the output data signal from the read channel to the control circuitry.

13. The disk drive mass storage system of claim 12 wherein the control circuitry provides the operational parameter to the parameter memory through the data/parameter path during a start-up.

14. The disk drive mass storage system of claim 13 wherein the parameter memory is coupled to the read channel so that the read channel can access the operational parameter during read operations.

15. The disk drive mass storage system of claim 12 wherein the read channel is a synchronously sampled data channel.

16. The disk drive mass storage system of claim 15 wherein the read channel is a partial response, maximum likelihood read channel.

17. A method for operating a mass storage system, the mass storage system having a read channel, memory, and control circuitry for providing stored data to a host, the method comprising the steps of:

retrieving an operational parameter stored in a memory device of the control circuitry during start-up;

providing the operational parameter through a data/parameter path to a memory device so that the read channel may access the operational parameter during read operations; and providing data from the read channel to the control circuitry through the data/parameter path.

18. The method of claim 17 wherein the operational parameter is retrieved and provided through the data/parameter path in response to executing a set of instructions in a microprocessor.

19. The method of claim 17 wherein the operational parameter is a filter coefficient.

20. The method of claim 17 wherein the mass storage system is a hard disk drive.

* * * * *